(12) United States Patent
Huemer et al.

(10) Patent No.: US 6,931,925 B2
(45) Date of Patent: Aug. 23, 2005

(54) METHOD FOR DETERMINING THE CURRENT FILLING LEVEL OF A LIQUID IN A CONTAINER

(75) Inventors: Herfried Huemer, Feldbach (AT); Horst Ruether, Hart/Graz (AT)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 10/426,777

(22) Filed: Apr. 30, 2003

(65) Prior Publication Data

US 2004/0011127 A1 Jan. 22, 2004

(30) Foreign Application Priority Data

Apr. 30, 2002 (AT) ........................................ A 663/2002

(51) Int. Cl.$^7$ ............................................. G01F 23/00
(52) U.S. Cl. .......................... 73/299; 73/290 R; 73/298
(58) Field of Search ..................... 73/299, 301, 290 R, 73/298

(56) References Cited

U.S. PATENT DOCUMENTS

| | | | | |
|---|---|---|---|---|
| 4,291,575 A | * | 9/1981 | Frissora | 73/302 |
| 4,368,639 A | * | 1/1983 | Owens | 73/301 |
| 4,639,738 A | * | 1/1987 | Young et al. | 347/89 |
| 4,669,309 A | * | 6/1987 | Cornelius | 73/299 |
| 4,972,705 A | * | 11/1990 | Fryer et al. | 73/152.18 |
| 5,052,222 A | * | 10/1991 | Stoepfel | 73/302 |
| 5,059,954 A | * | 10/1991 | Beldham et al. | 340/614 |
| 5,146,783 A | * | 9/1992 | Jansche et al. | 73/301 |
| 5,791,187 A | * | 8/1998 | Chang | 73/299 |
| 5,802,910 A | | 9/1998 | Krahn et al. | 73/299 |

FOREIGN PATENT DOCUMENTS

| | | | | |
|---|---|---|---|---|
| DE | 4010763 A1 | 11/1990 | | G01F/23/22 |
| DE | 4129549 A1 | 3/1993 | | G01F/23/22 |
| DE | 19826487 A1 | 12/1999 | | G01F/23/18 |
| EP | 0372 631 A1 | 6/1990 | | G01F/23/14 |

* cited by examiner

*Primary Examiner*—Hezron Williams
*Assistant Examiner*—Rodney Frank
(74) *Attorney, Agent, or Firm*—Roche Diagnostics Operations, Inc.

(57) ABSTRACT

The invention relates to a method for determining the current filling level of a liquid, preferably a calibrating, quality control, or cleaning fluid, or waste water, in a container, for example of an analyzer, where an immersion pipe is dipped into the liquid in the container to be filled or drained. The immersion pipe is connected to a pumping device via a tube system. The pressure p in the tube system is measured and increased, starting from the ambient pressure $p_0$, until a first discontinuous pressure change occurs at pressure $p_1$ due to the liquid column in the immersion pipe being forced out of the pipe, and/or the pressure p in the tube system is decreased until the liquid column in the immersion pipe reaches a change in cross-section of the immersion pipe, which change is situated above the maximum filling level of the liquid, such that a second discontinuous pressure change occurs at pressure $p_2$ due to the liquid column reaching the change in cross-section. The pressure difference between ambient pressure $p_0$ and the pressure $p_1$ or $p_2$ at one of the two pressure discontinuities or the time $t_1$ or $t_2$ until one of the two pressure discontinuities is reached, is recorded and used to determine the current filling level of the container.

11 Claims, 2 Drawing Sheets

METHOD FOR DETERMINING THE CURRENT FILLING LEVEL OF A LIQUID IN A CONTAINER

BACKGROUND OF THE INVENTION

The invention relates to a method for determining the current filling level of a liquid, preferably a calibration, quality control, or cleaning medium, or waste water, in a container, for example of an analyzer, where an immersion pipe is dipped into the liquid in the container to be filled or drained, which immersion pipe is connected via a tube system to a pumping device and is subject to a gaseous medium, preferably air, where the pressure p in the tube system is measured.

There are a variety of known methods and devices which may be used to measure in different ways the level of a liquid in a container. Besides purely mechanical methods using floaters connected to display devices, there are various physical methods which determine the change of a physical parameter in a riser pipe or immersion pipe by means of a sensor. The sensors described are either in direct contact with the fluid (conductivity or resistance sensors, etc.) or have only indirect contact with the fluid (optical sensors, dielectric measurements, etc.) The disadvantage of all these methods or devices lies in the relatively high cost of the sensors, in their limited lifetime when they are in contact with a fluid, and in the fact that costs are prohibitive in the case of the one-way or one-time containers used in medical testing, for example.

Medical analyzers are sometimes furnished with devices which determine the amount or the level of a liquid in a container by accurately recording the volume of liquid moved, for instance via the pumping rate, and by storing this information in the analyzer. If standard containers with known initial filling levels are used the filling levels of individual containers may be determined from the stored data. The disadvantage here is that the system will only work reliably if the performance of the pumping or suction system may be considered constant over a prolonged period of time, which is not the case with most peristaltic pumps. Furthermore an exchange of partly filled containers between analyzers of the same type is not possible when this method is used.

DESCRIPTION OF THE PRIOR ART

From DE 198 26 487 A1 a device for measuring the liquid level in a container is known which is based on the hydrostatic principle and comprises a pipe which is dipped into the liquid and subjected to a gaseous medium, preferably air, by means of a pump. When a gaseous medium is applied bubbles will form at the submerged end of the pipe and a pressure sensor will generate electric signals corresponding to the pressure in the pipe as a function of time. In an evaluation unit the characteristic pressure curve indicating the occurrence of bubbles is recognized, the pressure at this point in time is determined and subsequently the liquid level and the amount of liquid in the container is computed therefrom.

SUMMARY OF THE INVENTION

It is the object of the present invention to propose a simple method for determining the current filling level of a liquid in a container, which will require almost no additional parts and will tolerate the use of peristaltic pumps with non-constant pumping rate. Another object of the invention is that the components used in measuring the filling level may be calibrated and checked in a simple manner.

According to a first variant of the invention this object is achieved by measuring the pressure p in the tube system and by increasing the pressure, starting from ambient pressure $p_0$, until at pressure $p_1$ a discontinuous pressure change occurs due to the liquid column being forced out of the immersion pipe, and by employing the pressure difference between ambient pressure $p_0$ and pressure $p_1$ at the point of discontinuous pressure change, or alternatively the time $t_1$ until the discontinuous pressure change occurs, to compute the current filling level of the container.

In a second variant of the invention it is provided that the pressure p is decreased, starting from ambient pressure $p_0$, until the liquid column in the immersion pipe reaches a change in the pipe cross-section situated well above the maximum filling level of the liquid, such that, when the liquid column reaches this change in cross-section, a discontinuous pressure change will occur at a pressure $p_2$, and that the pressure difference between ambient pressure $p_0$ and pressure $p_2$ at the pressure discontinuity or the time $t_2$ until the pressure discontinuity is reached, will be determined and the filling level of the container will be computed therefrom.

If, for instance, the period of time T is known which the pumping device takes to pump the liquid column from the exit end of the immersion pipe up to the change in cross-section, the measured time $t_1$ (time until the first discontinuous pressure change occurs, starting from a given liquid level) may be used to compute the level of the liquid column in the immersion pipe, and thus in the container, from the formula $100 t_1/T$ as a percentage of the length of the immersion pipe.

If the method of the invention is used with analyzers in medical technology, for instance, all the elements necessary for applying the method will be present in the analyzer. In particular this will be true if a pressure sensor for measuring barometric air pressure is provided in the tube system—as is the case with blood gas multi-analyzers.

BRIEF DESCRIPTION OF THE DRAWINGS

Following is a more detailed description of the invention based on the case of a medical analyzer. It should be noted however that the method of measuring filling levels as proposed by the invention will be of use in a wide range of applications, especially when filling levels of combustible, toxic or corrosive liquids are to be determined.

DETAILED DESCRIPTION OF THE PREFERRED EMBODIMENTS

Figure 1:
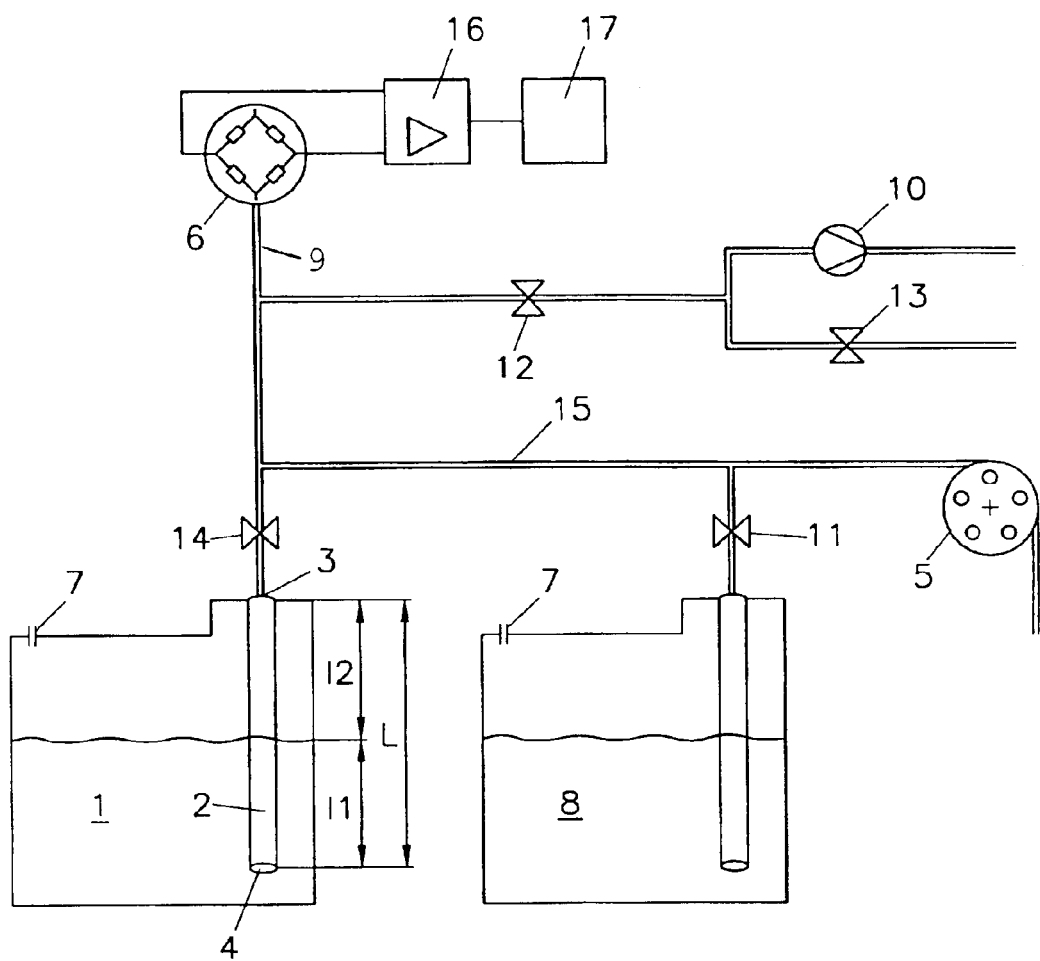
FIG. 1 is a schematic drawing of a device implementing the method of the invention, complete with pumping device and pressure measuring device.

In this context FIG. 1 shows a draining and filling device for withdrawing a liquid, for instance a calibrating or quality control or cleaning fluid, from a container 1 of an analyzer (not shown in detail) via an immersion pipe 2 dipped into the liquid. The immersion pipe 2 extends with its exit end 4 almost to the bottom of the container 1, its cross-section exhibiting a change 3 situated above the maximum filling level of the container, which is shown as a reduction in diameter in the drawing. According to the invention it would also be possible, however, to configure the change 3 as an increase in cross-section. The immersion pipe 2 for the draining of container 1 is connected to a perstaltic pump 5 of the pump assembly via a tube system 15, a pressure sensor 6 (baro-sensor) being attached to the tube system via a stub pipe 9 preferably provided with a droplet collector. An amplifier unit has the reference number 16 and the signal evaluation unit of the pressure sensor 6 has the reference number 17.

Via a valve 11 another container 8, e.g., a waste container receiving the effluents of the analyzer, is attached to the tube system 15. The two containers 1 and 8 may optionally be connected with the pump 5 via valves 11 and 14. By another valve 12 a vacuum pump 10 may be connected to the tube system 15, which latter may be subjected to the ambient pressure $p_0$ via an airing valve 13. To facilitate the filling of container 8 and the draining of container 1 the containers are provided with ventilation openings 7.

In an enhanced version of the invention the proposal is put forward that the pressure difference measured between the ambient pressure $p_0$ and the pressure $p_1$ or $p_2$ at one of the two pressure discontinuities should be calibrated with the absolute value of the pressure difference $|p_1-p_2|$. In this way an accurate determination of the filling level is obtained which does not depend on the ambient pressure $p_0$. In addition a continuous change of the slope of the pressure sensor (e.g., caused by ageing) will not influence the accuracy of the measurement of the filling level.

Figure 2:
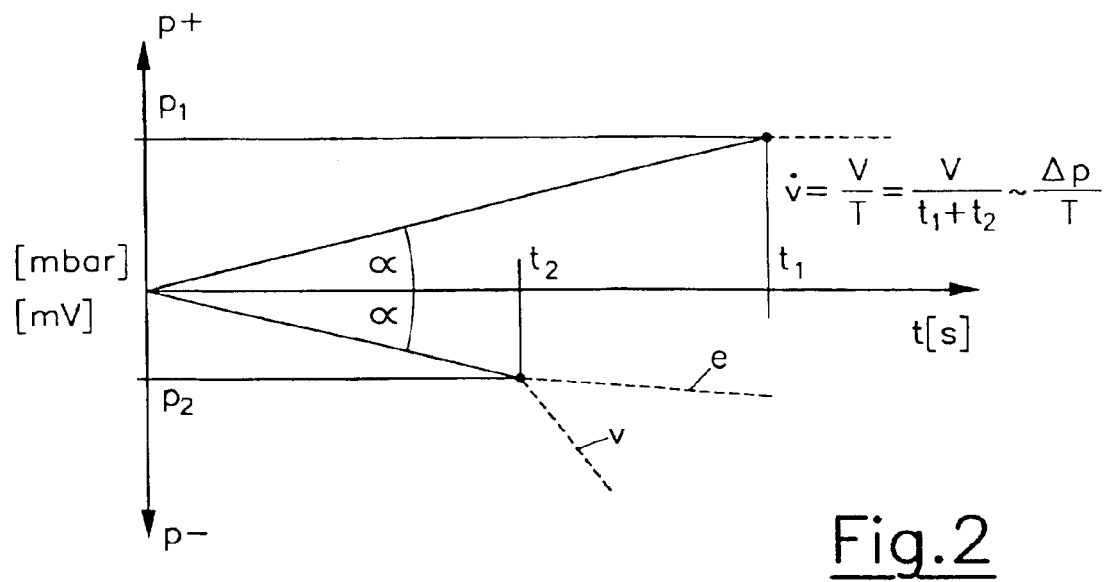
FIG. 2 shows a diagram for determination of the pumping rate (output per unit time) of a pump.

The change of pressure p in the tube system, given as a function of time t and measured in mbar or mV, is shown in FIG. 2. Thus for instance pressure in the tube system is increased until at pressure $p_1$ air bubbles appear at the end of the immersion pipe and a first discontinuous pressure change is recorded at time $t_1$. On the other hand, pressure in the tube system may be decreased such that the liquid column in the immersion pipe rises and reaches a change in cross-section, causing a second discontinuous pressure change at the pressure $p_2$ at time $t_2$, i.e., a kink in the pressure curve. If the cross-section is reduced the dotted pressure curve v will result, while an increase will produce the dotted curve e.

In a further variant of the invention the period of time T may be measured which the pumping device takes to move the liquid column from the exit end of the immersion pipe to the change in cross-section or vice versa from the change in cross-section to the exit end. Subsequently, the liquid column is moved to the exit end or up to the change in cross-section, starting from the given filling level at ambient pressure $p_0$, and the required time $t_1$ or $t_2$ is measured and calibrated by the period T. In this variant each measurement of the filling level is calibrated with the actual total time T, thus ensuring accurate determination of the filling level even when pumps with non-constant pumping rate are used.

A filling level measurement may proceed as follows:

By increasing the pressure in the tube system the liquid column in the immersion pipe is depressed until a change in pressure can no longer be observed (i.e., until air bubbles exit at the end of the immersion pipe). Then the liquid in the immersion pipe is induced to rise up to the change in cross-section, and the total time T required by the liquid to move from the exit end up to the change in cross-section, is determined. The time T is compared with time $t_1$ or $t_2$ required to move the liquid in the immersion pipe, starting from the prevailing filling level, either up to the change in cross-section or down to the exit end of the immersion pipe. From these times $t_1$ or $t_2$ the current filling level may be inferred.

The method according to the invention is further characterized by the advantage that in order to measure the filling levels of a plurality of containers the immersion pipes of the containers may be connected to the tube system one after the other. It is not necessary to provide a separate measuring device for each container of an analyzer, since the filling levels of the individual containers may be determined one after the other with the use of a single measuring device by simply opening or closing valves already present in the tube system.

As can be seen from FIG. 2 the pumping rate of the pumping device for the filling or draining station may also be determined without any additional components, said pumping device being connected via the tube system to the immersion pipe for the filling or draining of a container and said immersion pipe dipping into the liquid in the container.

In this context it is proposed by the invention, that the pressure p in the tube system be measured and, starting from the ambient pressure $p_0$, be increased until a first discontinuous pressure change occurs due to the liquid column in the immersion pipe being forced out, and that the pressure p in the tube system be decreased until the liquid column in the immersion pipe reaches a change in cross-section situated above the maximum filling level, thus causing a second discontinuous pressure change due to the liquid column encountering the change in cross-section, and that the time period T, which is required by the pumping device to move the liquid column from the site of one discontinuous pressure change to that of the other, be used to determine the pumping rate $\Delta v/\Delta t$ from the ratio V/T, where V is the known volume of the immersion pipe between exit end and change in cross-section.

In further development of the invention it is proposed that the pressure difference $|p_1-p_2|$ between the two discontinuous pressure changes be employed to determine the slope S of the pressure sensor, using the known length L of the immersion pipe between exit end and change in cross-section, and the hydrostatic pressure p(L) of the liquid column. If the length L of the immersion pipe is known the slope of the pressure sensor may thus be determined in a simple manner by measuring the pressure difference between a state where the immersion pipe is completely emptied and a state where it is filled up to the change in cross-section.

Figure 3:
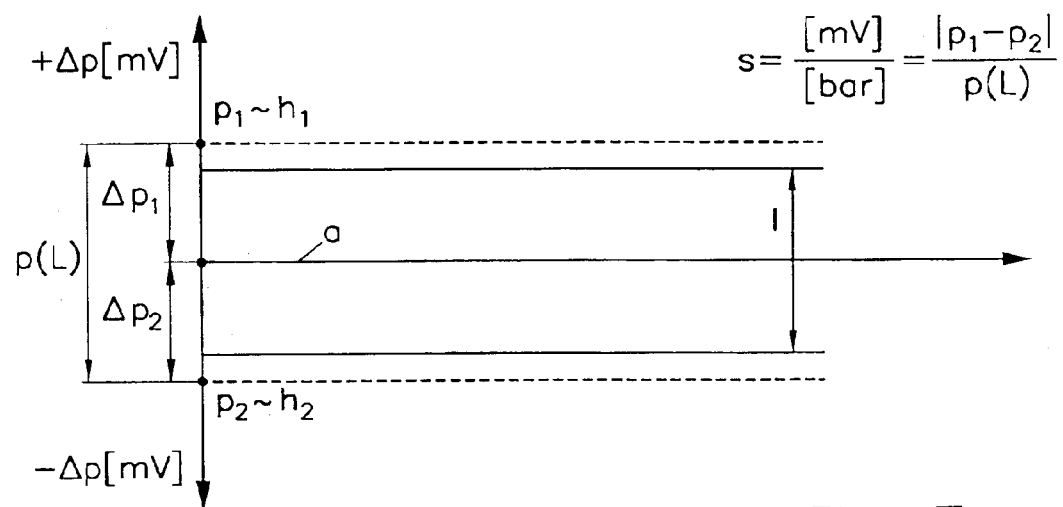
FIG. 3 shows a diagram for calibration of a pressure sensor.

The slope S is obtained from the formula $(|p_1-p_2|)/p(L)$, p(L) denoting the calibration pressure of the water column of height L. FIG. 3 illustrates the method, line a indicating the prevailing air pressure $p_0$.

The procedure according to the invention may also be used to ascertain whether or not a container is connected to a branch tube of the tube system. This will be of importance especially in the case of waste containers, since it is essential that contaminated biological samples not be discharged in an uncontrolled manner. Testing for the presence of the container may be carried out by generating a partial vacuum in the tube system either by means of the peristaltic pump 5 or the vacuum pump 10. On account of the ventilation opening 7 of the waste container 8, which has a defined diameter, a certain pressure will be established, which will differ from the pressure prevailing when no container is connected.

With the method of the invention it is furthermore possible to ascertain whether a connected container is empty, and to test the container and its seals for leaks by generating a positive or negative pressure difference against ambient pressure in the tube system using the pumping device (peristaltic pump 5 or vacuum pump 10) and analyzing the resulting pressure curve. By comparison with stored target values system defects may be diagnosed.

What is claimed is:

1. A method for determining the current filling level of a liquid in a container having an immersion pipe dipped into the liquid in the container, and a tubing system connecting the immersion pipe to a pumping device; the method comprising:
   (a) measuring the ambient gas pressure $p_0$ in the tubing system at a time $t_0$;
   (b) using the pumping device to increase the gas pressure in the tubing system;
   (c) measuring the gas pressure $p_1$ at a time $t_1$ when a first discontinuous pressure change occurs due to a liquid column being forced out of an exit end of the immersion pipe;
   (d) calculating at least one of the difference in pressure between $p_0$ and $p_1$ and the difference in time between $t_0$ and $t_1$; and
   (e) determining the current filling level of the liquid in the container by the difference in at least one of pressure and time, wherein the current filling level is related to the difference in pressure or time.

2. The method according to claim 1, wherein the liquid in the container is a calibration medium, a quality control medium, a cleaning medium or a waste solution.

3. The method according to claim 1, further comprising determining the current filling level of a liquid in at least one additional container having an immersion pipe connected to the tubing system, wherein the tubing system comprises a valve for each immersion pipe.

4. A method for determining the current filling level of a liquid in a container having an immersion pipe dipped into the liquid in the container, and a tubing system connecting the immersion pipe to a pumping device, wherein the immersion pipe has a change in cross-section located above a maximum filling level of the container; the method comprising:
   (a) measuring the ambient gas pressure $p_0$ in the tubing system at a time $t_0$;
   (b) using the pumping device to decrease the gas pressure in the tubing system;
   (c) measuring the gas pressure $p_2$ at a time $t_2$ when a second discontinuous pressure change occurs as a result of the liquid reaching the change in cross-section of the immersion pipe;
   (d) calculating at least one of the difference in pressure between $p_0$ and $p_2$ and the difference in time between $t_0$ and $t_2$; and
   (e) determining the current filling level of the liquid in the container by the difference in at least one of pressure and time, wherein the current filling level is related to the difference in pressure or time.

5. The method according to claim 4, wherein the liquid in the container is a calibration medium, a quality control medium, a cleaning medium or a waste solution.

6. The method according to claim 4, further comprising determining the current filling level of a liquid in at least one additional container having an immersion pipe connected to the tubing system, wherein the tubing system comprises a valve for each immersion pipe.

7. A method for determining the current filling level of a liquid in a container having an immersion pipe dipped into the liquid in the container, and a tubing system connecting the immersion pipe to a pumping device, wherein the immersion pipe has a change in cross-section located above a maximum filling level of the container; the method comprising:
   (a) measuring the ambient gas pressure $p_0$ in the tubing system at a time $t_0$;
   (b) using the pumping device to increase the gas pressure in the tubing system;
   (c) measuring the gas pressure $p_1$ at a time $t_1$ when a discontinuous pressure change occurs as a result of the liquid column being forced out of an exit end the immersion pipe;
   (d) calculating at least one of the difference in pressure between $p_0$ and $p_1$ and the difference in time between $t_0$ and $t_1$;
   (e) using the pumping device to decrease the gas pressure in the tubing system;
   (f) measuring the gas pressure $p_2$ at a time $t_2$ when a discontinuous pressure change occurs as a result of the liquid reaching in cross-section of the immersion pipe;
   (g) calculating at least one of the difference in pressure between $p_1$ and $p_2$ and the difference in time between $t_1$ and $t_2$; and
   (h) determining the current filling level of the liquid in the container by the difference in at least one of pressure and time, wherein the current filling level is related to the difference in pressure or time.

8. The method according to claim 7, wherein the pressure difference measured between the ambient pressure $p_0$ and the pressure $p_1$ or $p_2$ is calibrated with an absolute value of the pressure difference $|p_1-p_2|$.

9. The method according to claim 7, wherein the slope of a pressure sensor S is determined using the pressure difference $|p_1-p_2|$, the length L of the immersion pipe between the exit end and the change in cross-section, and a hydrostatic pressure p(L) of the liquid column.

10. The method according to claim 7, wherein a pumping rate $\Delta v/\Delta t$ is determined from a ratio V/T, wherein T is the difference between $t_1$ and $t_2$, and V is the volume of the immersion pipe between the exit end and the change in cross-section.

11. A method for determining the pumping rate of a pumping device connected through a tube system to an immersion pipe for filling or draining a container with a liquid, the immersion pipe dipping into the liquid in the container; the method comprising:
   (a) measuring the ambient gas pressure $p_0$ in the tube system;
   (b) using the pumping device to increase the gas pressure;
   (c) measuring the gas pressure $p_1$ at a time $t_1$ when a first discontinuous pressure change occurs due to a liquid column in the immersion pipe being forced out of an exit end of the pipe;
   (d) using the pumping device to decrease the gas pressure;
   (e) measuring the gas pressure $p_2$ at a time $t_2$ when a discontinuous pressure change occurs as a result of the liquid reaching a change in cross-section of the immersion pipe; and
   (f) determining a pumping rate $\Delta v/\Delta t$ from a ratio V/T, where V is a known volume of the immersion pipe between the exit end and the change in cross-section, and T is the difference between $t_2$ and $t_1$.

* * * * *